United States Patent [19]

Kingston et al.

[11] Patent Number: 4,852,121
[45] Date of Patent: Jul. 25, 1989

[54] COHERENT PSEUDONOISE CODE TRACKING LOOP

[75] Inventors: Samuel C. Kingston, Salt Lake City; John W. Zscheile, Jr., Farmington, both of Utah

[73] Assignee: Unisys Corporation, Blue Bell, Pa.

[21] Appl. No.: 111,372

[22] Filed: Oct. 16, 1987

[51] Int. Cl.$^4$ ............................................. H04K 1/02
[52] U.S. Cl. ...................................................... 375/1
[58] Field of Search ............................. 375/1; 380/34

[56] References Cited

U.S. PATENT DOCUMENTS

| | | | |
|---|---|---|---|
| 4,017,798 | 4/1977 | Gordy et al. | 375/1 |
| 4,163,944 | 8/1979 | Chambers et al. | 375/1 |
| 4,538,280 | 8/1985 | Mosley, Jr. et al. | 375/1 |
| 4,707,839 | 11/1987 | Andren et al. | 375/1 |

*Primary Examiner*—Salvatore Cangialosi
*Attorney, Agent, or Firm*—John B. Sowell; Robert S. Bramson; Mark T. Starr

[57] ABSTRACT

A coherent pseudonoise code (PN) tracking loop is provided with apparatus for sensing the absence of PN transition in the incoming data stream to the tracking loop and for switching OFF the data stream to prevent phase error distortion and inherent noise from entering the tracking loop which could be sensed as false or incorrect phase error signals. The apparatus includes a transition switch in the incoming data stream that is responsive to transition gate control logic coupled to the output of the PN replica generator in the tracking loop for switching OFF the incoming data stream when no PN transitions are occurring.

10 Claims, 3 Drawing Sheets (A) PN REPLICA IN SYNC @14
(B) PN INPUT ADVANCED @11
(C) DN INPUT DELAYED @11
(D) 2A ⊗ 2C @15
(E) VCO CLOCK @17
(F) 2D ⊗ 2E @19
(G) PN REPLICA SKEWED @14
(H) 2G ⊗ 2C @15
(I) 2H ⊗ 2E @19

COHERENT PSEUDONOISE CODE TRACKING LOOP

BACKGROUND OF THE INVENTION

1. Field of the Invention

This invention relates to a new and improved code tracking loop for coherent pseudonoise code receivers. More particularly, the present invention relates to a new error signal generation apparatus and novel transition gate logic circuitry.

2. Description of the Prior Art

Heretofore, coherent pseudonoise code tracking loops were known. Such prior art pseudonoise code tracking loops had two specific limitations which are solved by the present invention. The major limitation in the prior art code tracking loops were caused when the error signals became very small. The height and the shape of the error signal was attenuated to the point that it was difficult to properly control a voltage control oscillator in the tracking loop. The other limitation is caused in the prior art tracking loops when the keying and clock timing are skewed so as to cause timing offset. Timing offset, as will be explained hereinafter, causes error slope flattening near the null points. Another problem which has not been treated in the prior art is that sensitivity is degraded in the tracking loop when no transitions occur in the input line and no error signals are being generated. Under such conditions, all of the noise comes in through the input line and is processed as an error signal which can then cause distortions and improper operation of the voltage control oscillator in the tracking loop.

It would be desirable to provide a coherent pseudonoise code tracking loop which reshapes and redefines the error signal and the signal produced by timing offset so as to provide a distinct error correction signal which can be presented to the voltage controlled oscillator. Further, it would be desirable to provide a logic circuit which is capable of eliminating noise on the input line when there are no transitions of data at the input line.

SUMMARY OF THE INVENTION

It is a primary object of the present invention to provide a new and improved coherent pseudonoise code tracking loop.

It is another primary object of the present invention to provide a modified tracking loop for producing improved PN generated signals.

It is another object of the present invention to provide means for sensing the absence of PN transitions in the input signals to the tracking loop and for eliminating the noise at the input of the code tracking loop when there are no PN transitions.

It is yet another object of the present invention to provide means for stabilizing the voltage controlled oscillator in a code tracking loop during the acquisition of coherent pseudonoise coded signals.

According to these and other objects of the present invention, there is provided in a code tracking loop, a pseudonoise generator for generating PN replica signals. Logic circuitry is coupled to the PN generator to reshape the replica signals and reclock the signals to avoid time skew errors and distortions. There is further provided a transition gate for sensing the absence of transitions at the input to the code tracking loop so as to eliminate noise introduced into the code tracking loop when no PN transitions are occurring.

DESCRIPTION OF THE PREFERRED EMBODIMENT

Figures 1, 2:
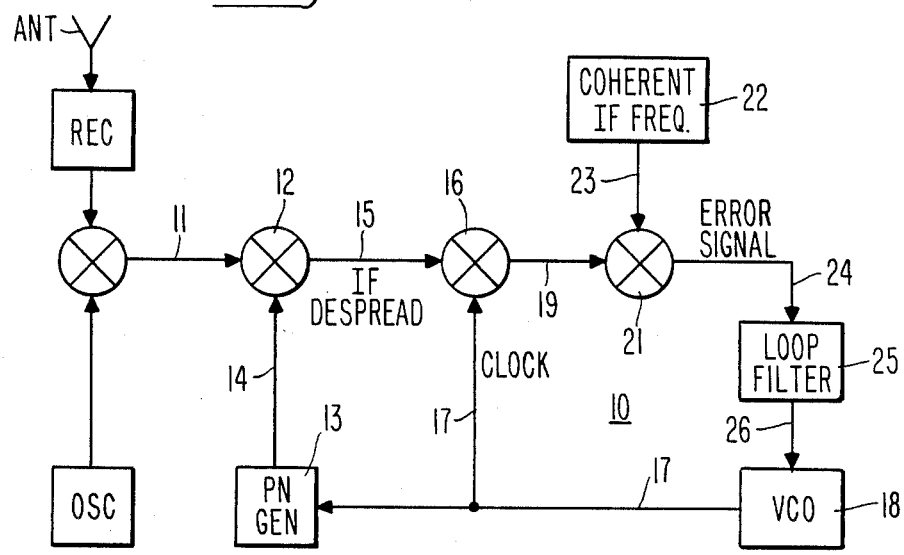
FIG. 1 is a schematic block diagram of a prior art type coherent tracking loop.
FIG. 2 is a timing diagram showing signal waveforms produced in FIG. 1.

In order to explain clearly the improvement provided by the present invention, it is necessary to describe generally, a coherent pseudonoise tracking loop of the type employed in the prior art to describe the problems associated therewith. For purposes of this explanation, a typical prior art tracking loop is shown in FIG. 1 wherein a receive signal has been processed and down converted before being applied to the input line 11 of code tracking loop 10. The signal on line 11 comprises a pseudonoise (PN) spread spectrum IF signal which is applied to the despreader (multiplier) 12. A pseudonoise generator 13 produces a replica PN signal on line 14 which is applied to the multiplier 12. The output of multiplier 12 on line 15 is a modulated despread IF signal which is applied to a second multiplier 16. A clock signal on line 17, which is generated by the voltage controlled oscillator (VCO) 18 is applied to multiplier 16 to produce a clock modulated IF signal on line 19 that is applied to a mixer 21. A coherent IF frequency signal generator 22 produces a pure IF sine wave tone signal on line 23 which is applied to mixer 21 that results in an error voltage signal being produced on output line 24. The error signal on line 24 is applied to loop filter 25 which provides the proper spectrum shape to the error signal on line 26 to properly operate the voltage controlled oscillator (VCO) 18. The PN generator follows or tracks the signal on line 11. For purposes of explanation, elements 12, 16 and 21 comprise the phase detector in this prior art embodiment.

Refer now to FIG. 2 showing waveforms A to I. Each of the waveforms has a number associated with the waveforms which indicates the line in FIG. 1 on which the waveform or a waveform content appears. Refer to FIG. 2A showing the waveform which occurs on line 14 from the pseudonoise generator 13 that provides a replica of the incoming pseudonoise signal on line 11. FIG. 2B shows the PN input signal on line 11 which is assumed to be locked on but is slightly out of phase in that the input signal on line 11 is advanced relative to the signal on line 14. FIG. 2C shows the input signal on line 11 delayed. When the delayed signal on line 11 and the line 14 signal are combined, the waveform shown at FIG. 2D results. These pulses 27 are indicative of the phase error. The phase error waveform on line 15 is combined at multiplier 16 with the VCO clock on line 17 shown as FIG. 2E. The output signal on line 19 is shown as FIG. 2F which appears having smaller positive pulses 28 than negative pulses 29. The error signal on line 19 has the IF frequency component removed at mixer 21 and leaves the error signal on line 24 which is applied to the voltage controlled oscillator 18 via filter 25. As explained above, the FIG. 2F signal is more negative than positive and the resultant negative voltage signal on line 26 causes the voltage controlled oscillator 18 to slow down the clock on line 17 as well as the PN replica signal on line 14, to synchronize the waveforms A, B and C on lines 11 and 14.

Waveform FIG. 2G shows the PN replica signal on line 14 slightly advanced. When the PN replica signal is advanced or offset and combined with the aforementioned signal on line 11 shown on FIG. 2C, a new error signal is produced as shown at FIG. 2H on line 15. It will be noted that the width of the phase error pulse 31 has been increased and when the signal is combined with the clock on line 17, a new and distorted error signal 20 is produced as shown at FIG. 2I on line 19. When this signal is applied via line 24 and filter 25 to the voltage controlled oscillator 18, the error signal may be positive on line 26 instead of being negative as described hereinbefore when the FIG. 2F error signal was produced. Thus, the voltage controlled oscillator 18 receives a signal which causes it to speed up or stay substantially the same due to errors associated with offset of the PN generator signal at the receiving site.

When the error pulses 20 become very narrow compared to the width of one clock time as shown in FIG. 2I, there is very little energy in the narrow pulses 20 and the majority of the energy can be lost due to stray capacitance in the transmission lines or interconnections. When such a narrow pulse similar to the error pulse 20 is produced and it is applied to the multiplier 16 to produce an error signal on line 24 most of the energy has been lost and the voltage controlled oscillator 18 does not receive a proper error correction voltage signal.

Figure 3:
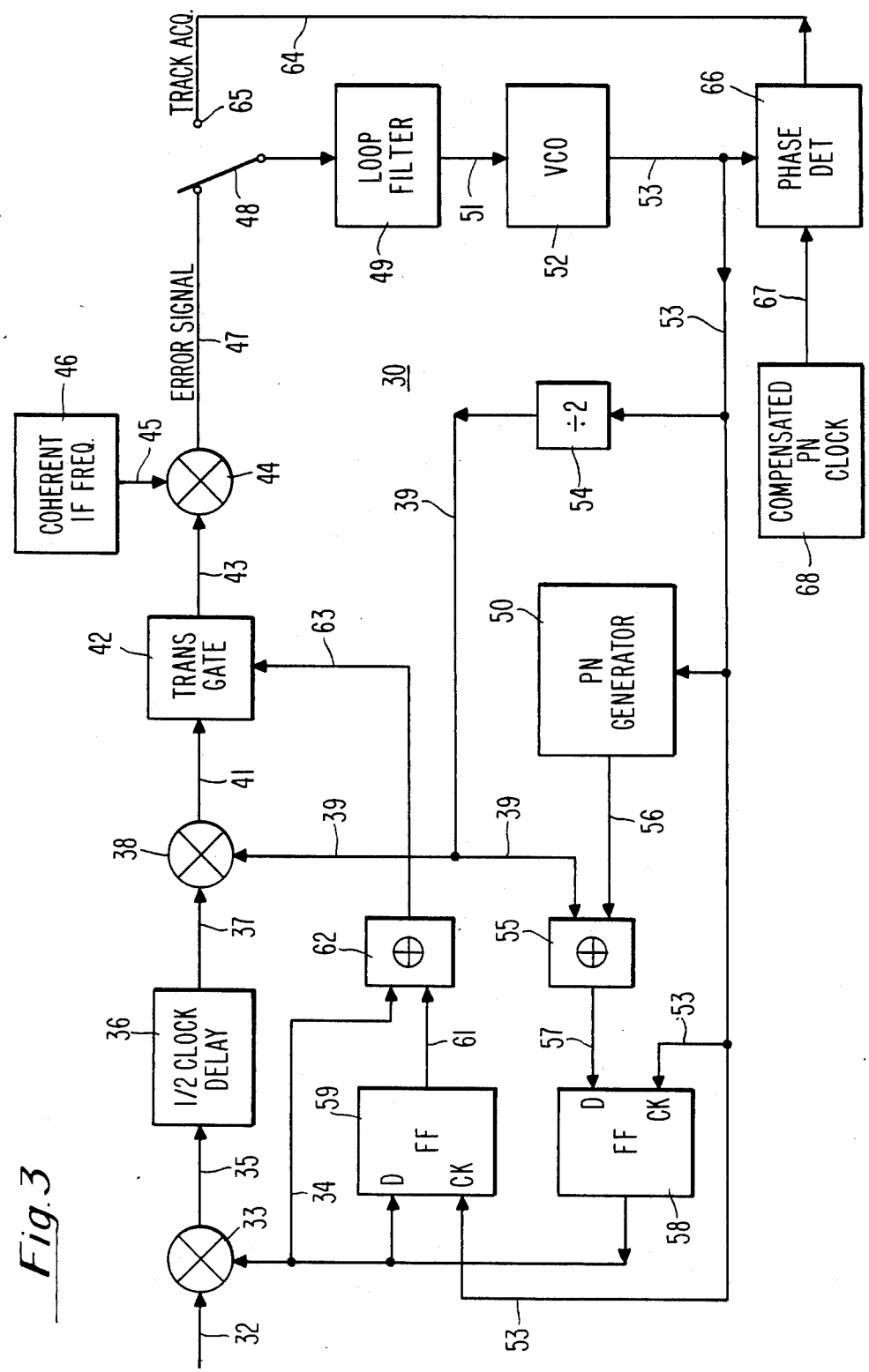
FIG. 3 is a schematic block diagram of the present invention novel coherent PN code tracking loop.

Refer now to FIG. 3 showing a schematic block diagram of the present invention novel coherent PN code tracking loop 30. The aforementioned PN modulated IF signal (on line 11) is applied to line 32 and this signal is applied to a high isolation mixer 33. A modified PN replica code signal on line 34 is also applied to mixer 33 to produce a modulated IF signal on line 35. The modulated IF signal on line 35 is delayed one half of one clock time in delay 36 to produce a delayed modulated IF signal on line 37. The delayed modulated IF signal on line 37 is applied to mixer 38 along with a clock signal which has been divided by two on line 39. An ungated error signal on line 41 at the output of mixer 48 is applied to a transition gate 42 to pass the aforementioned error signal on line 41 only when there are transitions occurring at the input line 32. The gated error signals now appear on line 43 and are applied to a third mixer 44 which has a second input 45 connected to a coherent IF frequency source 46. The IF frequency on line 45 strips the IF frequency off of the signal input on line 43 resulting in a pure error signal on line 47. For purposes of explanation, elements 33, 36, 38 and 44 comprise the phase detector in the present invention. The error signal on line 47 is connected through a switch 48 to a loop filter 49 and via line 51 to a voltage controlled oscillator 52 which produces the aforementioned clock signal on output line 53. The clock signal on line 53 is divided by two in divider 54 to produce the clock-over-two signal on line 39. The clock-over-two signal is also applied to exclusive OR gate 55 along with the original PN generated signal on line 56 to produce the aforementioned modified PN replica code signal on line 57. The modified PN replica code signal is reclocked and reshaped in a flip-flop 58 which also has a clock input from line 53. The modified PN replica code signal on line 34 is also applied to a second flip-flop 59 which also has a line 53 clock input to produce a delayed modified PN replica signal on line 61. The delayed modified PN replica code signal on line 61 is applied to an exclusive OR gate 62 along with the aforementioned modified PN replica code signal on line 34 to produce a transition gate signal on line 63. It will be understood that the transition gate signal on line 63 turns gate 42 OFF when transitions are occurring on line 34. Similarly, when transitions are occurring on line 32, gate 42 is turned ON as will be explained in greater detail hereinafter.

In the preferred embodiment of the present invention, there is provided a bypass loop 64, shown connected to the normally open terminal 65 of switch 48. Loop 64 is connected to a phase detector 66. The phase detector 66 is supplied with a compensated referenced clock signal on line 67 provided by the doppler compensated reference clock source 68. When the novel tracking loop is first placed in operation, acquisition of the signal on line 32 requires that the voltage controlled oscillator be very closely aligned, or synchronized with the incoming signal on line 32. In order to provide this synchronization, the switch 48 is moved from the position shown in FIG. 3 to the normally open contact 65 to close the bypass loop 64 of the voltage controlled oscillator 52 with the reference clock 68. The voltage controlled oscillator 52 is synchronized with the reference clock. Switch 48 is returned to its normal position only after PN coincidence has been detected by an external circuit (not shown) which connects switch 48 back to its normal position.

Refer now to FIGS. 4A to 4K showing the waveforms produced in the present invention code tracking loop 30 show in FIG. 3. The FIG. 4A waveform appears at the output of the PN generator 50 on line 56. The FIG. 4B waveform is provided on line 39 and is connected to the aforementioned exclusive OR circuit 55 to produce the novel PN replica code signal on line 57 which is processed and reshaped by flip-flop 58 to produce the modified PN replica code signal on line 34 shown in FIG. 4C. The data input signal on line 32 is shown as a PN input at FIG. 4D. When the signals on lines 34 and 32 are combined in mixer 33, there is produced a transition signal shown on line 35 as FIG. 4E. The signal on line 35 is delayed so as to produce a delayed transition signal as shown at FIG. 4F on line 37. The signal on line 37 is mixed in mixer 38 with the clock-over-two signal on line 39 shown in FIG. 4G to produce an ungated error signal on line 41 shown as FIG. 4H. When transition signals are occurring on line 63, at the gate 42, they are shown as FIG. 4I. The transition gate signal on line 63 cuts off the gate 42 when no transition signals are occurring at the input line 32 so as to produce a modified gated error signal on line 43 as shown in FIG. 4J. While it is impossible to show the noise signal that would have occurred on line 43 when no transitions were occurring at input line 32, it will be understood that the noise signals could be large enough to generate signals which could be interpreted as error signals. Note that the waveform 69 which occurs during the gate OFF time, shown in FIGS. 4H and I, has a zero mean or average level. This pulse has been eliminated from the gated error signal output on line 43 by turning off gate 42. Thus, the gated error signal is not contaminated by noise occurring during the gate OFF signal time. The clock output from VCO 52 is shown as FIG. 4K.

Figure 4:
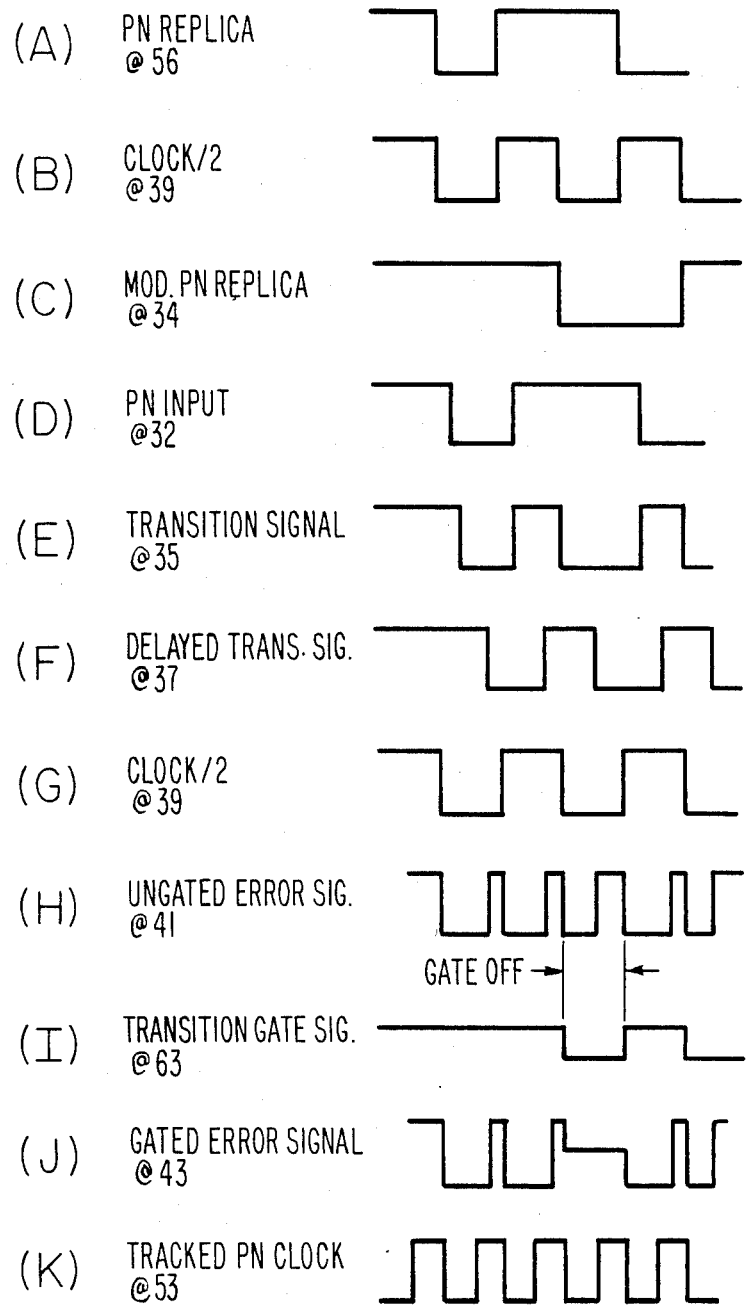
FIG. 4 is a timing diagram showing the improved signal waveforms produced in FIG. 3.

It will be noted that none of the above-mentioned waveforms in FIG. 4 show an offset for the output from PN generator 50 with respect to the clock transitions. This offset has been eliminated at flip-flop 58 which reclocks the output on line 57 described hereinbefore as the modified PN replica code signal.

It will be noted that the PN replica signal at line 56 which is modified and produced on line 34 contains transitions where they would not ordinarily occur in the PN replica signal, thus, when the modified PN replica signal on line 34 is combined with the input PN signal on line 32, there is never a narrow pulse of the type shown in FIG. 2 at pulse 20 which could be attenuated and distorted as occurs in the prior art code tracking loop.

Having explained a preferred embodiment of the present invention, it will be understood that the two problems which occurred in the prior art code tracking loops identified as very narrow or small error signals and errors which occurred because of the skewed PN generator replica signal, do not occur in the present invention tracking loop.

Further, the present invention novel code tracking loop has eliminated the distortion due to noise appearing at input line 32 when no transitions are occurring at input line 32. Further, the novel code tracking loop shown in FIG. 3 is further provided with means for stabilizing the voltage controlled oscillator output during acquisition.

What is claimed is:

1. A coherent pseudonoise (PN) code tracking loop of the type having means for detecting the phase error between the incoming PN signal and a PN replica generator driven by the output of a voltage controlled oscillator, the improvement comprising:
   an isolation mixer, coupled to the source of incoming PN signals,
   a PN replica generator coupled to said voltage controlled oscillator,
   exclusive OR gating means coupled to the output of said PN replica generator for providing a modified PN generator signal coupled to said isolation mixer,
   transition gating means coupled to the output of said an isolation mixer,
   delay means operable to delay the signal output of said an isolation mixer to said transition gating means, and
   transition gate control means having its output coupled to said transition gating means to switch OFF said incoming PN signals from the output of said an isolation mixer when no data transitions are occurring in said incoming PN signals.

2. A coherent PN tracking loop as set forth in claim 1 wherein said exclusive OR gating means is coupled to a flip-flop which provides said modified PN generator signal.

3. A coherent PN tracking loop as set forth in claim 2 wherein said transition gate control means comprises a second flip-flop coupled to a second exclusive OR gate which provides said output coupled to said transition gating means.

4. A coherent PN tracking loop as set forth in claim 3 wherein said modified PN generator signal is coupled to said second flip-flop.

5. A coherent PN tracking loop as set forth in claim 4 which further includes a divide by two circuit coupled to said voltage controlled oscillator and further being coupled to said exclusive OR gating means.

6. A coherent PN tracking loop as set forth in claim 5 which further included a second mixer coupled between said delay mean and said transition gating means and further being coupled to the output of said divide by two circuits.

7. A coherent PN tracking loop as set forth in claim 6 wherein said delay means provides one-half of one clock time delay of said incoming PN signals.

8. A coherent PN tracking loop as set forth in claim 1 which further includes a normally closed track acquisition switch connected to said phase error signal in said tracking loop, said track acquisition switch being adapted to be moved to an open position to connect the output of a phase detector to the input of said voltage controlled oscillator and the output of said voltage controlled oscillator being connected to said phase detector.

9. A coherent PN tracking loop as set forth in claim 8 which further includes a compensated PN clock generator having its output coupled to said phase detector for driving the frequency of said voltage controlled oscillator to the frequency of said compensated PN clock generator.

10. A method of eliminating distorted phase error signals and noise in a coherent PN tracking loop in the absence of data signals, the steps comprising:
   apply incoming data signals to said tracking loop,
   sensing the absence of PN transition signals in said incoming data signal to said tracking loop, and
   switching OFF said incoming data signals to said tracking loop in the absence of PN transition signals.

* * * * *